(12) United States Patent
Eichinger

(10) Patent No.: US 10,871,132 B2
(45) Date of Patent: Dec. 22, 2020

(54) COALESCENCE ELEMENT AND FILTER ELEMENT HAVING A COALESCENCE ELEMENT

(71) Applicant: MANN+HUMMEL GmbH, Ludwigsburg (DE)

(72) Inventor: Stefan Eichinger, Gerlingen (DE)

(73) Assignee: Mann+Hummel GmbH, Ludwigsburg (DE)

( * ) Notice: Subject to any disclaimer, the term of this patent is extended or adjusted under 35 U.S.C. 154(b) by 329 days.

(21) Appl. No.: 15/951,246

(22) Filed: Apr. 12, 2018

(65) Prior Publication Data
US 2018/0230952 A1 Aug. 16, 2018

Related U.S. Application Data

(63) Continuation of application No. PCT/EP2016/071161, filed on Sep. 8, 2016.

(30) Foreign Application Priority Data

Oct. 15, 2015 (DE) .................... 10 2015 013 351

(51) Int. Cl.
*F02M 37/24* (2019.01)
*B01D 36/00* (2006.01)
(Continued)

(52) U.S. Cl.
CPC ........... *F02M 37/24* (2019.01); *B01D 17/045* (2013.01); *B01D 27/148* (2013.01); *B01D 29/21* (2013.01);
(Continued)

(58) Field of Classification Search
CPC .......... B01D 17/045; B01D 2239/0681; B01D 36/003; F02M 37/24
See application file for complete search history.

(56) References Cited

U.S. PATENT DOCUMENTS

| | | | | |
|---|---|---|---|---|
| 3,222,413 A | * | 12/1965 | Wojcik | C07C 7/171 585/811 |
| 3,239,452 A | * | 3/1966 | Van Beest | B01D 11/04 208/187 |
| 4,309,289 A | * | 1/1982 | Head | B01D 17/045 210/488 |
| 2003/0010002 A1 | * | 1/2003 | Johnson | B01D 39/1623 55/486 |

(Continued)

FOREIGN PATENT DOCUMENTS

DE 102014115167 A1 4/2015
DE 102013020539 A1 6/2015
(Continued)

OTHER PUBLICATIONS

W.Molter et al., "Separation of ultrafine droplets with multi-layer fibroid filter media using the example of compressed air filtration"; F&S International Edition No. Dec. 2012.*

*Primary Examiner* — Ana M Fortuna
(74) *Attorney, Agent, or Firm* — James Hasselbeck

(57) ABSTRACT

A coalescence element is provided with at least one coalescence medium configured to coalesce water contained in a fluid. The at least one coalescence medium is made of a material with a packing density of at most 10%. The coalescence element is embodied as a single layer formed as a cylindrical jacket and has a fluid path for a fluid between an inlet side and an outlet side of the cylindrical jacket. A filter element with a filter bellows and a support pipe arranged coaxially inside the filter bellows is provided with such coalescence element that is arranged between the filter bellows and the support pipe in the flow direction so as to surround the support pipe at a radial outer side.

17 Claims, 1 Drawing Sheet

(51) Int. Cl.

| | | |
|---|---|---|
| | *B01D 29/21* | (2006.01) |
| | *B01D 29/58* | (2006.01) |
| | *B01D 17/04* | (2006.01) |
| | *B01D 27/14* | (2006.01) |
| | *F02M 37/34* | (2019.01) |
| | *B01D 39/16* | (2006.01) |
| | *D01F 6/92* | (2006.01) |

(52) U.S. Cl.
CPC ............ *B01D 29/58* (2013.01); *B01D 36/003* (2013.01); *B01D 39/1623* (2013.01); *D01F 6/92* (2013.01); *F02M 37/34* (2019.01); *B01D 2239/0681* (2013.01)

(56) References Cited

U.S. PATENT DOCUMENTS

| | | | |
|---|---|---|---|
| 2009/0032475 A1* | 2/2009 | Ferrer | B01D 39/1623 210/799 |
| 2013/0146523 A1 | 6/2013 | Veit et al. | |
| 2015/0027942 A1* | 1/2015 | Chen | B01D 29/58 210/323.2 |
| 2016/0136554 A1* | 5/2016 | Swaminathan | B01D 17/045 55/487 |
| 2016/0288033 A1 | 10/2016 | Reyinger et al. | |
| 2019/0105587 A1* | 4/2019 | Pietschner | B01D 29/58 |

FOREIGN PATENT DOCUMENTS

| | | |
|---|---|---|
| DE | 102014011785 A1 | 6/2015 |
| JP | 2000288303 A | 10/2000 |

\* cited by examiner

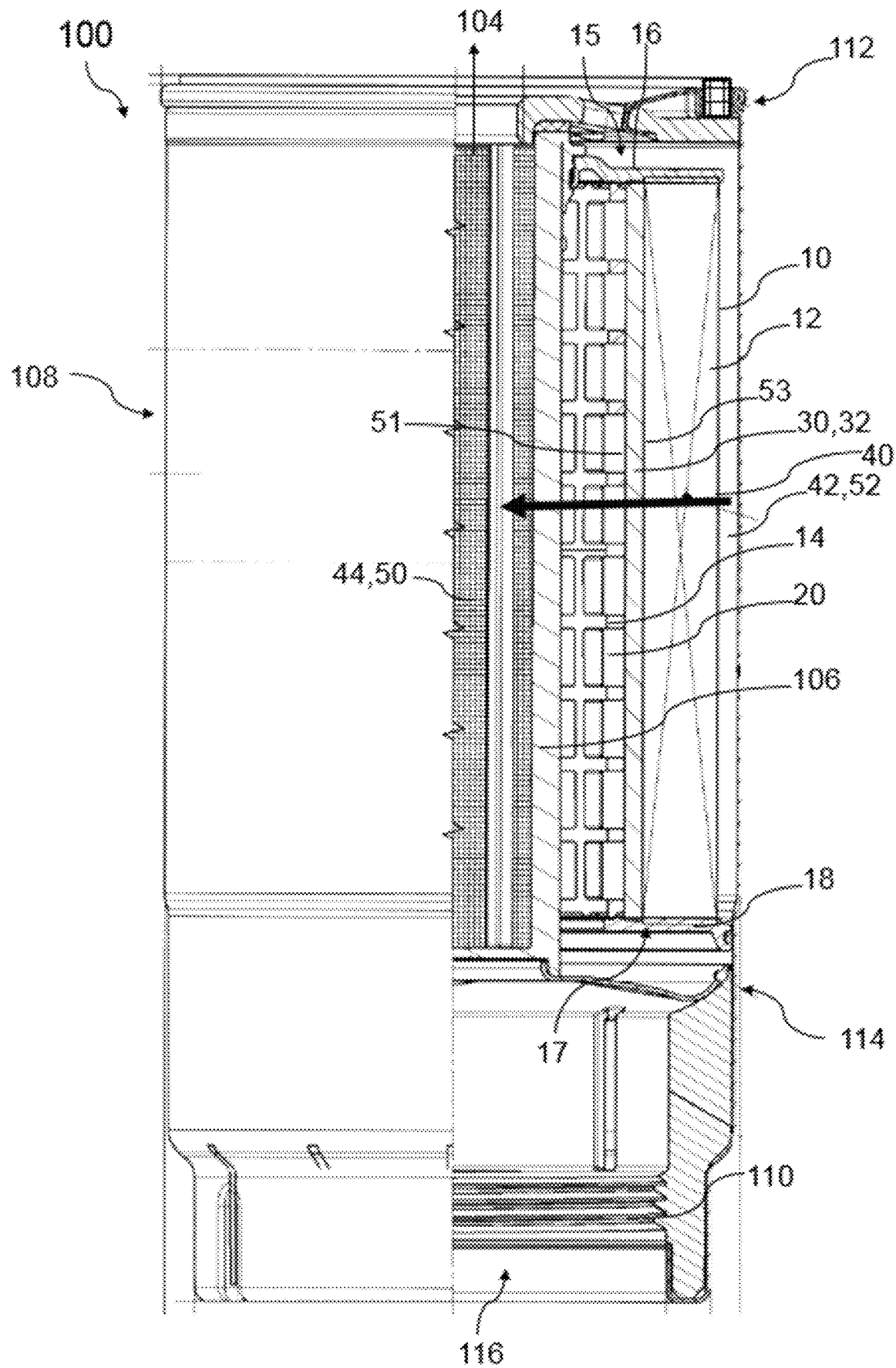

COALESCENCE ELEMENT AND FILTER ELEMENT HAVING A COALESCENCE ELEMENT

CROSS-REFERENCE TO RELATED APPLICATIONS

This application is a continuation application of international application No. PCT/EP2016/063742 having an international filing date of 15 Jun. 2016 and designating the United States, the international application claiming a priority date of 19 Aug. 2015, based on prior filed German patent application No. 10 2015 010 843.3, the entire contents of the aforesaid international application and the aforesaid German patent application being incorporated herein by reference.

BACKGROUND OF THE INVENTION

The invention concerns a coalescence element as well as a filter element having a coalescence element for filtering a fluid as well as a filter system having a filter element, especially a fuel filter of a motor vehicle.

DE 10 2011 120 638 A1 discloses a filter element for filtering a fluid, for example, fuel, that is suitable for removal of contaminants such as water from the fuel. The filter element is realized in a type of sandwich construction.

SUMMARY OF THE INVENTION

In this context, a multi-layer coalescence medium is embedded between the filter medium and a support pipe, wherein the coalescence medium is comprised of one or several shape-unstable materials embedded shape-stably between the filter medium and the support pipe and seal-tightly connected at one end face to the end member. With shape-unstable materials, coalescence media can be realized which are optimized in regard to their coalescence efficiency and/or their flow permeability. Shape-unstable materials can be matched in a simple way to different installation spaces, even during final assembly. Shape-unstable means in this context that the inherent shape stability and/or inherent stiffness of the coalescence medium is insufficient in order to ensure that the coalescence medium does not bend or buckle when solely connected to the end member, i.e., without the assistance of the described sandwich construction, in particular by pushing into a corresponding soft connecting medium, for example, adhesive or melted surface material of the end member, that will later on cure; the stability and/or the seal-tightness of the connection can be impaired by bending or bucking. The support pipe and the filter medium ensure the shape stability of the entire composite. The layers of the coalescence medium can include a single or of different materials. The coalescence medium and the filter medium can be produced of different materials.

It is an object of the invention to configure a coalescence element for separation of water from a fluid in such a way that the coalescence element is reliable, efficient, and robust, is of a compact and simple configuration, and can be produced as simply as possible.

Further objects of the invention reside in providing a filter element for separation of water from a fluid as well as a filter system for receiving such an exchangeable filter element, which is reliable, efficient, and robust, is of a compact and simple configuration, and can be produced as simply as possible.

The aforementioned object is solved according to an aspect of the invention for a coalescence element with a fluid path between an inlet side and an outlet side in that at least one coalescence medium is provided which is provided for coalescing water contained in the fluid.

Beneficial configurations and advantages of the invention result from the additional claims, the description, and the drawing.

A coalescence element is proposed that comprises a fluid path for a fluid between an inlet side and an outlet side and that comprises at least one coalescence medium which is provided for coalescing water contained in the fluid. The coalescence element is embodied as a single layer as a cylindrical jacket wherein the coalescence medium is comprised of a material with a packing density of at most 10%.

Advantageously, the coalescence element can have a packing density of at most 8%, in particular at least 2%, for example of 6%. Moreover, the coalescence medium can have a relatively high thickness of several millimeters.

Packing density refers to a property of a material such as a nonwoven web material which is reverse proportional to its density and the characteristics of the material permeability and porosity. A minimal packing density corresponds to a high permeability and great porosity. The packing density is defined as $$\text{packing density } [\%] = \frac{3.937 \cdot \text{weight per surface area of web } [\text{g/m}^2]}{\text{web thickness } [\text{mils}] \cdot \text{bulk density } [\text{g/cm}^3]}$$

The weight per surface area of the web (in $\text{g/m}^2$) is calculated based on the weight of a web sample of 10 cm×10 cm.

The web thickness (in mils, 1 mill=$\frac{1}{1000}^{th}$ of an inch) is measured on a web sample of 10 cm×10 cm with a thickness testing gauge having a testing base with dimensions of 5 cm×12.5 cm at an applied pressure of 150 Pa.

The bulk density (in $\text{g/cm}^3$) is the bulk density of the polymer or the polymer mixture of which the web is formed, taken from the pertinent literature.

The packing density generally can also be considered as a measure for the proportion of the filter fibers per depth of the filter layer section, in this case, the coalescence element, i.e., the packing density is to be understood as a packing density of fibers or filter fibers per surface area unit or volume unit. The packing density can be determined for each filter layer and for each filter layer section, for example, by means of grinding patterns or sectional patterns of the filter medium embedded in resin, in this case the coalescence medium. Such a grinding pattern is subjected to an imaging process and the surface area of the grinding pattern is evaluated such that a ratio is determined of the proportion of the surface area of the grinding pattern that is covered by fibers to the total surface area of the filter layer section or of the proportion of the surface area of the grinding pattern that is not covered by fibers to the total surface area of the filter layer section.

The determination of the packing density can be based on the recorded image by evaluating the pixels where a fiber can be seen and those pixels that indicate an interstice. In case of a fixed or known total number of the pixels in the filter layer section, the packing density can be determined thereby such that a ratio is determined of the number of the pixels that show a filter fiber to the total number of the pixels in the filter layer section. Alternatively, the number of the pixels that show an interstice can be subtracted from the total number of the pixels in order to have a comparative value in this way. Depending on whether the interstices or the fibers can be seen and evaluated better on the grinding pattern, the corresponding pixels can be counted.

The packing density detected in this way is an average packing density of the evaluated filter layer section. The smaller such a filter layer section is preset, i.e., the smaller the depth of the filter layer section in the direction of the flow direction, the smaller the deviations of the packing density at the edges of the filter layer section from the determined average value.

The packing density can be determined also by means of a three-dimensional computer tomography image. In analogy to the pixels of a recorded image, in a three-dimensional image there are points in space whose number and size depend on the technical specifications of the imaging device. The determination of the packing density of a three-dimensional image by means of points in space is realized in this context in analogy to the method with pixels. A ratio can be determined of the points in space containing an interstice, respectively, of the points in space containing a filter fiber to the total number of points in space in order to determine the packing density in this way.

Packing density jump refers to a sudden change of the packing density across the material depth of the filter medium, i.e., two filter layer sections adjoining each other exhibit a different packing density at the transition between the filter layer sections adjoining each other. Such a packing density jump can act in particular as a mostly undesirable dirt barrier and can lead to clogging of a filter medium prior to its reaching the maximum dirt particle storage capacity in that the dirt particles occupy and clog a depth section of the filter medium around the packing density jump.

In this context, in particular a percentage change of the packing density between the outflow surface of a filter layer and the inflow surface of a filter layer which is adjoining in the flow direction can be decisive for preventing dirt barriers. The packing density gradient can serve as a measure for the change of the packing density across the material thickness of a filter layer in the flow direction. The packing density increases either by a decreasing number of fiber interstices or by a decreasing size of fiber interstices at a depth section of a filter layer, i.e., in a filter layer section.

Fuel may contain a certain quantity of water which can cause damage of the injection device of an internal combustion engine. In order to prevent this, at the clean side of a filter system the contained water can be separated from the fuel, for example, by means of a swirling device wherein the first fluid is caused to rotate and thus by means of the different specific density of the water, and can flow out separately. Alternatively, the coalescence element serves for agglomeration of small water droplets to larger water drops which can then be guided along a final separator due to gravity into a collecting chamber. In the water separation, the coalescence element, the geometry of the sedimentation space of the water droplets, and the final separator interact and form together the water separation device.

The coalescence element is designed to coalesce the major portion of the emulsified water in the fluid, i.e., to enlarge the drop size of the emulsified water and to separate the thus coalesced water from the fuel. The water that is heavier than fuel can deposit at the bottom and drain through suitable passages. Also, it can be comminuted in downstream pumps.

According to the invention, the employed coalescence medium is adapted to a suction-side positioning in a fuel supply system of an internal combustion engine in that the coalescence medium has a relatively minimal packing density so that it cannot become clogged by smaller particles. Especially in the case of use in a prefilter where coarser and more open-pore filter media are used in comparison to a main filter, there is the risk that the coalescence medium can become clogged by particles. In this context, it is relevant in regard to service life that it is prevented based on the material properties that the meshes will clog. Water droplets that are formed by the coalescence element are comminuted in the downstream pump due to the suction-side use so that they can be separated in a downstream main filter. Due to the packing density of at most 10% according to the invention, this can be achieved advantageously. Due to the minimal packing density of the coalescence medium, it is thus possible to achieve a coalescence of water drops of originally 40 μm to 150 μm, for example, in diesel fuel, to several millimeters in diameter.

Expediently, material of staple fibers reinforced by needling can be used as the coalescence medium. Advantageously, open pore structure and thickness of the material correlate in this context. In case of a relatively open-pore coalescence medium, a larger thickness of the medium is advantageously selected.

Alternatively or additionally, the coalescence medium can be formed advantageously of a material with a relatively large pore size, in particular with an average pore size of at least 100 μm. Moreover, the coalescence medium can have a relatively high thickness of several millimeters. Due to the open pore structure and/or the thickness of the coalescence medium, it is thus possible to further improve a coalescence of water drops of originally 40 μm to 150 μm, for example, in diesel fuel, to several millimeters in diameter. Preferably, for this purpose, hydrophobic material is employed or a material with a hydrophobic surface.

The porosity of a filter layer is a measure for the number and the size of the interstices between the filter fibers of the filter layer. For example, the porosity can indicate which resistance a fluid flow will encounter, for example, an air flow which penetrates a filter layer. A filter layer in this context is open at the inflow side and at the outflow side so that a fluid flow at the inflow surface can penetrate into the material and can exit at the outflow side from the material. The porosity can be viewed as the ratio of hollow space volume to total volume. With increasing amount of porosity, the proportion of the hollow space volume relative to total volume is greater.

The porosity of an air filter medium, of a filter layer or of a filter layer section can be defined in particular individually by specifying the pore volume.

Advantageously, different coalescence material in composition, structure, and construction of the material can be used.

According to an advantageous embodiment, the coalescence medium can be comprised of polyester, wherein the coalescence medium comprises a thickness in a range between 2 mm and 5 mm, preferably in a range between 2.8 mm and 4 mm, and/or an air permeability of at least 1,000 $l/cm^2h$, preferably of at least 1,500 $l/cm^2h$, particularly preferred up to 4,500 $l/cm^2h$. In this context, the coalescence medium beneficially can be comprised to 100% of polyester in order to achieve the desired coalescence of water drops in this way.

The determination of the thickness of nonwovens or nonwoven webs is carried out according to DIN EN ISO 9073-2 (1997-02). Samples at 10 different locations of a specimen are taken and tested. The samples can have a size of DIN A5 and are measured at two locations at the center of the surface area. In deviating therefrom, also smaller samples can be measured if no samples of this size are available. As a result, the individual values of the samples as well as an average value, including mean variation, are provided in the unit mm (millimeter).

The determination of the thickness for voluminous nonwovens or nonwoven webs is carried out in accordance with DIN EN ISO 9073-2 (1997-02). Voluminous nonwovens are nonwovens that upon a change of an applied pressure of 0.1 kPa to 0.5 kPa are compressible by at least 20%, i.e., to 80% of the initial thickness prior to changing the applied pressure. Samples at 10 different locations of a specimen are taken and tested. The samples can have a size of 130 mm×80 mm. In deviating therefore, also smaller samples can be measured if no samples of this size are available. As a result, the individual values of the samples as well as an average value, including mean variation, are provided in the unit mm.

The determination of the air permeability of an air filter medium can be carried out according to DIN EN ISO 9237 (1995-12) which requires a sample surface of 20 cm$^2$ and a differential pressure of 200 Pa. In this context, samples at 10 different locations of the air filter medium to be tested are to be taken and tested. The samples have in general a diameter of 56 mm and are circular. Should the filter medium be too narrow to provide these sample sizes, the diameter of a sample can be 42 mm or even 25 mm. The result is provided in the unit l/m$^2$ s, but also l/cm$^2$h, as an average value and as mean variation.

Alternatively or additionally, according to a further advantageous embodiment the coalescence medium can be made of viscose wherein the coalescence medium has a thickness in a range between 0.5 mm and 4 mm, preferably of 1 mm and 3 mm, and/or an air permeability of at least 1,000 l/cm$^2$h, preferably up to 3,000 l/cm$^2$h. When using viscose, it is therefore possible to work with a somewhat reduced thickness and a reduced air permeability of the coalescence medium in order to achieve the same coalescence values for the separation of water.

Alternatively or in addition, according to a further advantageous embodiment the coalescence medium can be made of a mixture of viscose and PET.

According to a further advantageous embodiment, the coalescence element for separation of water drops can interact with a final separator that is arranged at the outlet side of the coalescence element and that is made of a hydrophobic material, in particular PET, and preferably comprises a mesh size of 40 μm. Alternatively, a material with hydrophobic surface can also be used, for example, polyamide (PA) with hydrophobic surface.

A hydrophobic material has the advantage that the water can agglomerate particularly easily to drops and can drain across the surface.

In the coalescence medium, the small water drops are enlarged as they pass through the coalescence element. In the gap between the coalescence element and the final separator, large drops fall, assisted by gravity, in downward direction into a collecting chamber of a filter system from where the collected water, for example, by means of a screw, can be drained to the exterior during servicing.

Smaller drops which are initially not falling downwardly due to gravity are hindered by the hydrophobic surface of the final separator from passing to the clean side and also fall down into the collecting space. Water drops with a drop size that is smaller than the mesh size of the final separator, which can be, for example, 40 μm, pass through the final separator to the clean side and are subsequently comminuted by a downstream low-pressure pump so that they can be separated in a downstream main filter.

According to a further advantageous embodiment, the coalescence element at its oppositely positioned end faces can be fluid-tightly connected with an end disk, respectively. In this way, it is ensured that the fluid, i.e., for example diesel fuel, can be subjected as completely as possible to water separation. Both end disks can also be identical to the end disks of a filter element in which the coalescence element is used.

According to a further aspect, the invention concerns a filter element for filtering a fluid, with a fluid path between a raw side and a clean side that includes at least one filter bellows which at its oppositely positioned end faces is fluid-tightly connected with an end disk, respectively. Further, the filter element comprises at least one support pipe which is arranged coaxially within the filter bellows, which is connected with the two end disks, and which comprises passages for flow of the fluid as well as at least one coalescence element which, in flow direction, is arranged between the filter bellows and the support pipe and which is provided for coalescence of water contained in the fluid. In this context, the coalescence element surrounds the support pipe as a cylindrical jacket at a radial outer side.

The filter element according to the invention comprises an outer media layer, the filter bellows, as well as an inner media layer, the coalescence element, for filtering a fluid, for example, fuel, and is suitable in particular for removal of contaminants such as water from the fuel. The filter bellows is designed such that free and dissolved water passes through the filter bellows and beneficially is pre-coalesced thereat. The coalescence element is designed to coalesce the major portion of the emulsified water in the fluid, i.e., to enlarge the drop size of the emulsified water and to separate the thus coalesced water from the fuel. The water which is heavier than fuel can deposit at the bottom of the filter element and can be collected thereat in a container of a filter system from where it is subsequently discharged.

The filter element according to the invention can be employed particularly advantageously for use in filter elements used at the suction side of an internal combustion engine. It can be employed as complete filter as well as fuel prefilter for applications in heavy-duty commercial vehicles. Prefilters are used, for example, in commercial vehicles in order to separate coarse dirt and water from the diesel fuel. They are often used upstream of the low-pressure pump at the chassis. These fuel prefilters are designed such that only very small differential pressures may be produced at the filter element because, as an operating pressure, they have maximally the ambient pressure (1 bar) available to them. Usually, differential pressure increases of maximally 500 mbar are present for loading/vehicle use. According to the invention, the employed coalescence medium is adapted to the suction-side positioning of the filter element in that the coalescence medium has a relatively large pore size so that it cannot become clogged by smaller particles. In particular when used in the prefilter where coarser and more open-pore filter media are used in comparison to a main filter, there is the risk that the coalescence medium can become clogged by particles. In this context, it is relevant to the service life that it is prevented, based on the material properties that the pores will become clogged. Water droplets that are not separated in a prefilter are further comminuted in a downstream pump and can be separated in a downstream main filter. This is advantageously achieved by the minimal packing density of the coalescence material of at most 10%.

According to a further advantageous embodiment, the coalescence element can be supported in a shape-stabilizing way between the filter bellows and the support pipe. In particular when using a shape-unstable coalescence medium, it is beneficial when the fabric or nonwoven is embedded between two relatively shape-stable elements as they are constituted by the filter bellows and the support pipe.

According to further advantageous embodiment, the filter bellows can be designed of a hollow cylindrical shape wherein the fluid path extends radially through the filter bellows and the coalescence element, in particular from an exterior region into an interior region of the hollow cylindrical shape. Such a hollow cylindrical shape is beneficial in order to use the filter element in a round filter system as they are frequently used in the automotive field, in particular in commercial vehicles. Advantageously, the first fluid path can extend from an outer region into an inner region into the filter element. This arrangement enables inflow, for example, of fuel, from the exterior about the circumference of the filter element through the filter medium of the filter body that is, for example, folded in a star shape. The fuel can then flow through the filter element inwardly and can be supplied through the interior region of the filter element to the fuel supply system of an internal combustion engine.

According to a further advantageous embodiment, the coalescence element can be arranged at the clean side of the filter bellows. The filter bellows is designed such that free and dissolved water passes through the filter bellows and beneficially is pre-coalesced thereat. The coalescence element is designed for coalescing the major portion of the emulsified water in the fluid, i.e., to enlarge the drop size of the emulsified water, and to separate the thus coalesced water from the fuel.

According to a further aspect, the invention concerns a filter system with a filter element arranged in a filter housing for filtering a fluid, wherein the filter element at its clean side is provided with a coalescence element for coalescing water contained in the fluid. The filter element comprises an outer media layer, the filter bellows, as well as an inner media layer, the coalescence element, for filtering the fluid, for example, fuel, and is suitable in particular for removal of contaminants such as water from fuel. The filter bellows is designed such that free water is initially filtered when fluid enters the filter element from the exterior. The free water does not penetrate the filter bellows and stays substantially outside of the filter element. The coalescence element is designed to coalesce the major portion of the emulsified water in the fluid, i.e., to enlarge the water drops and to separate the thus coalesced water from the fuel. The water, that is heavier than fuel, can deposit at the bottom of the filter element and can drain through suitable passages at a lower end disk. Also, it can be comminuted in downstream pumps.

According to an advantageous embodiment of the filter system, the filter element can comprise a hollow cylindrical filter bellows with a support pipe arranged inside the filter bellows, wherein the coalescence element in flow direction is arranged between the filter bellows and the support pipe, and wherein the coalescence element is of a single layer configuration and surrounds the support pipe as a cylindrical jacket at a radial outer side.

According to a further advantageous embodiment of the filter system, a final separator can be arranged at a clean side within the filter element. Due to its screening action, such a final separator can serve to additionally retain fibers, which might have become detached from the coalescence medium, from the fluid so that these fibers cannot reach an internal combustion engine along the further fluid path. Moreover, free water in the fluid is passed mostly through the filter bellows. In the coalescence medium, the small water drops are enlarged as they pass through the coalescence element. In the gap between the coalescence element and the final separator, large drops fall downwardly, assisted by gravity, into a collecting space of the filter system from where the collected water, for example, by a screw, can be drained to the exterior during servicing.

Smaller drops that initially do not fall downwardly due to gravity are hindered by the hydrophobic surface of the final separator from passing to the clean side and fall also downwardly into the collecting space. Water drops with a drop size that is smaller than the mesh size of the final separator, which is, for example, 40 µm, pass through the final separator to the clean side and are comminuted in a downstream low-pressure pump so that they can be separated in a downstream main filter.

Advantageous is a use of the filter system for filtering fuel, in particular diesel fuel. As an alternative, the use of such a configuration for other liquid fluids that must be filtered and contain water is conceivable. Of course, such filter systems for other liquid fluids will also usually provide coalescence elements so that the use of the proposed coalescence element is conceivable also for filtering other fluids.

Further advantageous is a use of the filter system as a prefilter (upstream filter) of a fuel supply system of an internal combustion engine. Such a prefilter can be beneficially used as a pre-stage of the filtration of a fuel supply system of an internal combustion engine upstream of a main filter system so that coarser particles in the fuel can already be filtered out and can no longer reach the main filter.

Also, a use of the filter system at the suction side of a fuel supply system of an internal combustion engine is advantageous. It is thereby prevented that larger particles can reach a downstream fuel pump because the particles are already filtered out upstream of the pump. Moreover, smaller water drops, which are not separated by the coalescence element and the downstream final separator, can be comminuted in the downstream pump so that they can then be further separated in a downstream main filter.

BRIEF DESCRIPTION OF THE DRAWING

Further advantages result from the following FIGURE description. In the drawing, embodiments of the invention are illustrated. The drawing, the description, and the claims contain numerous features in combination. A person of skill in the art will consider the features expediently also individually and combine them to other expedient combinations.

FIG. 1 shows a longitudinal section of a filter system according to an embodiment of the invention for the fuel filtration in a motor vehicle with a single-layer coalescence element.

DESCRIPTION OF PREFERRED EMBODIMENTS

In the FIGURES, same or same-type components are identified with same reference characters. The FIGURES show only examples and are not to be understood as limiting.

The invention is illustrated with the aid of a fuel filter for filtering fuel, in particular diesel fuel, but can also be provided for other filter systems with appropriate adaptation of the construction.

FIG. 1 shows a longitudinal section of a filter system 100 according to an embodiment of the invention for the fuel filtration in a motor vehicle with a single-layer coalescence element 30. The filter system 100 comprises a filter element 10 arranged in a filter housing 108 for filtering a fluid, wherein the filter element 10 provides at its clean side 50 a coalescence element 30 for coalescing water contained in the fluid. The filter element 10 is inserted as a round filter element in a round filter housing 108 which is comprised of a housing top part 112 and a housing bottom part 114. The filter element 10 is centrally seated in the housing 108 and is clamped with two end disks 16, 18 in the filter housing 108. Within the filter element 10, a final separator 106 is arranged at a clean side 50 and covers the entire fluid path 40 because the final separator 106 projects at both end faces 15, 17 past the filter element 10 and is connected fluid-tightly with the housing top part 112 and the housing bottom part 114. Fluid is supplied to the filter housing 108 from the exterior by an inlet, not illustrated, and passes from the radial outer side through the filter element 10 and can reach an interior of the filter housing 108 through the filter bellows 12, the coalescence element 30 as well as the final separator 106. The filtered fluid is then discharged via this interior through an outlet 104, illustrated in FIG. 1 at the top.

The separated water is collected in a water collecting space 116 from where it can be discharged to the exterior. For this purpose, the filter system 100 can be screwed with this water collecting space 116 by a screw thread 110 onto a connecting socket (not illustrated).

The filter element 10 for filtering a fluid, with the fluid path 40 between a raw side 52 and a clean side 50, comprises a filter bellows 12 which is fluid-tightly connected at its oppositely positioned end faces 15, 17 to an end disk 16, 18, respectively. The filter element 10 comprises furthermore a support pipe 14 which is coaxially arranged within the filter bellows 12 and which is connected with the two end disks 16, 18 and which comprises passages 20 for flow of the fluid therethrough. Furthermore, the filter element 10 comprises a coalescence element 30 with a coalescence medium 32 which is arranged in the flow direction between the filter bellows 12 and the support pipe 14 and which is provided for coalescing water contained in the fluid. The coalescence element 30 is of a single-layer configuration and surrounds the support pipe 14 as a cylindrical jacket at a radial outer side 22. The fluid flows through the coalescence element 30 from an inlet side 53 to an outlet side 51.

The coalescence medium 32 is preferably formed of a material with a packing density of at most 10%, in particular at least 2%, for example of 6%. The coalescence medium 32 can comprise an average pore size of at least 100 μm. The coalescence medium 32 is expediently made of polyester wherein the coalescence medium 32 has a thickness in a range between 2 mm and 5 mm, preferably in a range between 2.8 mm and 4 mm, and/or an air permeability of at least 1,000 l/cm²h, preferably of at least 1,500 l/cm²h, particularly preferred up to 4,500 l/cm²h. Alternatively, it is also conceivable that the coalescence medium 32 is made of viscose wherein the coalescence medium 32 then has a thickness in a range between 0.5 mm and 4 mm, preferably of 1 mm and 3 mm, and/or an air permeability of at least 1,000 l/cm²h, preferably up to 3,000 l/cm²h.

The coalescence element 30 is fluid-tightly connected to the two end disks 16, 18 and is supported in a shape-stabilizing way between the filter bellows 12 and the support pipe 14. The filter bellows 12 is embodied of a hollow cylindrical shape wherein the fluid path 40 extends radially through the filter bellows 12 and the coalescence element 30, in particular from an outer region 42 into an inner region 44 of the hollow cylindrical shape. The coalescence element 30 is thus arranged at the clean side 50 of the filter bellows 12.

Free water in the fluid is guided mostly through the filter bellows 12. In the coalescence medium 32, the small water drops are enlarged as they pass through the coalescence element 30. In the gap between the coalescence element 30 and the final separator 106, large drops, assisted by gravity, fall downwardly into a collecting space 116 of the filter system 100 from where the collected water, for example, by means of a screw, is drained to the exterior during servicing.

Smaller drops which are initially not falling downwardly due to gravity are hindered by the hydrophobic surface of the final separator 106 from passing to the clean side 50 and also fall downwardly into the collecting space. The final separator 106 is made of a hydrophobic material, in particular of PET, and comprises preferably a mesh size of 40 μm. Water drops with a drop size that is smaller than the mesh size of the final separator, which is, for example, 40 μm, pass through the final separator 106 to the clean side 50 and are comminuted in a downstream low-pressure pump so that they can be separated in a downstream main filter.

What is claimed is:

1. A coalescence element embodied as a single layer formed as a cylindrical jacket and comprising
   a fluid path for a fluid between an inlet side and an outlet side of the cylindrical jacket, the coalescing element comprising:
      at least one coalescence medium configured to coalesce water contained in the fluid and comprised of a material with a packing density of at most 10%;
   wherein the at least one coalescing medium is made of staple fibers of polyester, viscose or a combination thereof;
   wherein the staple fibers of the at least one coalescing medium are reinforced fibers, reinforced by needling;
   wherein the at least one coalescing medium has an average pore size of at least 100 μm; and
   wherein the at least one coalescing medium has an air permeability of greater than 1500 l/cm²h and less than or equal to 4,500 l/cm²h.

2. The coalescence element according to claim 1, wherein\
   the packing density is at most 8% and at least 2%.

3. The coalescence element according to claim 1, wherein the at least one coalescence medium is made of polyester and
   the at least one coalescence medium comprises a thickness in a range between 2 mm and 5 mm.

4. The coalescence element according to claim 1, wherein the at least one coalescence medium is made of viscose and
   the at least one coalescence medium comprises a thickness in a range between 0.5 mm and 4 mm.

5. The coalescence element according to claim 1, wherein the at least one coalescence medium is made of viscose and
   the at least one coalescence medium comprises an air permeability of at least 1,000 l/cm²h.

6. The coalescence element according to claim 1, further comprising
   a final separator arranged at the outlet side,
   wherein the final separator is comprised of a hydrophobic material or a material with a hydrophobic surface.

7. The coalescence element according to claim 1, further comprising
end disks that are fluid-tightly connected to oppositely positioned end faces of the cylindrical jacket.

8. A filter element comprising:
a raw side and a clean side and a flow path for a fluid to be filtered in a flow direction from the raw side to the clean side;
at least one filter bellows comprising oppositely positioned end faces;
end disks fluid-tightly connected to the oppositely positioned end faces of the at least one filter bellows;
at least one support pipe arranged coaxially inside the at least one filter bellows,
the at least one support pipe connected to the end disks,
wherein the at least one support pipe comprises passages allowing the fluid to be filtered to pass through the at least one support pipe;
at least one coalescence element embodied as a single layer formed as a cylindrical jacket and comprising
a fluid path for the fluid to be filtered between an inlet side and an outlet side of the cylindrical jacket,
the coalescing element comprising:
at least one coalescence medium configured to coalesce water contained in the fluid to be filtered and comprised of a material with a packing density of at most 10%:
wherein the at least one coalescing medium is made of staple fibers of polyester, viscose or a combination thereof;
wherein the staple fibers of the at least one coalescing medium are reinforced fibers, reinforced by needling;
wherein the at least one coalescing medium has an average pore size of at least 100 μm; and
wherein the at least one coalescing medium has an air permeability of greater than 1500 l/cm²h and less than or equal to 4,500 l/cm²h;
wherein the cylindrical jacket of the at least one coalescence element is arranged between the at least one filter bellows and the at least one support pipe in the flow direction and surrounds the at least one support pipe at a radial outer side of the at least one support pipe.

9. The filter element according to claim 8, wherein
a shape of the coalescence element is supported and stabilized between the at least one filter bellows and the at least one support pipe.

10. The filter element according to claim 8, wherein
the at least one filter bellows comprises
a hollow cylindrical shape and
wherein the fluid path extends radially through the at least one filter bellows and the at least one coalescence element.

11. The filter element according to claim 10, wherein
the flow direction of the fluid path extends radially from an exterior region to an interior region of the hollow cylindrical shape of the at least one filter bellows.

12. The filter element according to claim 8, wherein
the coalescence element is arranged at a clean side of the at least one filter bellows.

13. A filter system for filtering a fluid, the filter system comprising:
a filter housing;
a filter element arranged in the filter housing and comprising
a raw side and
a clean side and
a flow path for a fluid to be filtered in a flow direction from the raw side to the clean side;
wherein the filter element comprises
at least one filter bellows comprising oppositely positioned end faces,
wherein the end disks are fluid-tightly connected to the oppositely positioned end faces of the at least one filter bellows;
wherein the filter element further comprises
at least one support pipe arranged coaxially inside the at least one filter bellows, the at least one support pipe connected to the end disks,
wherein the at least one support pipe comprises passages allowing the fluid to be filtered to pass through the at least one support pipe;
wherein the filter element further comprises
at least one coalescence element embodied as a single layer formed as a cylindrical jacket and comprising
a fluid path for the fluid to be filtered between an inlet side and an outlet side of the cylindrical jacket,
the coalescing element comprising:
at least one coalescence medium configured to coalesce water contained in the fluid to be filtered and comprised of
a material with a packing density of at most 10%;
wherein the at least one coalescing medium is made of staple fibers of polyester, viscose or a combination thereof;
wherein the staple fibers of the at least one coalescing medium are reinforced fibers, reinforced by needling;
wherein the at least one coalescing medium has an average pore size of at least 100 μm; and
wherein the at least one coalescing medium has an air permeability of greater than 1500 l/cm²h and less than or equal to 4,500 l/cm²h;
wherein the cylindrical jacket of the at least one coalescence element is arranged between the at least one filter bellows and the at least one support pipe in the flow direction and surrounds the at least one support pipe at a radial outer side of the at least one support pipe;
wherein the at least one coalescence element of the filter element is arranged at a clean side of the filter element.

14. The filter system according to claim 13, wherein
the at least one filter bellows is a hollow cylindrical filter bellows.

15. The filter system according to claim 13, wherein
the filter element further comprises
a final separator arranged inside the filter element at the clean side.

16. The filter system according to claim 13, configured as a fuel filter system.

17. The filter system according to claim 13, configured as a prefilter or a suction-side filter system of a fuel supply system of an internal combustion engine.

* * * * *